United States Patent
Arai et al.

(10) Patent No.: US 7,280,903 B2
(45) Date of Patent: Oct. 9, 2007

(54) CRUISE CONTROL APPARATUS FOR VEHICLE

(75) Inventors: Toshiaki Arai, Utsunomiya (JP); Tadayoshi Okada, Shioya-gun (JP); Hisaya Izawa, Utsunomiya (JP); Makoto Matsumoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 237 days.

(21) Appl. No.: 11/217,863

(22) Filed: Aug. 31, 2005

(65) Prior Publication Data

US 2006/0100769 A1 May 11, 2006

(30) Foreign Application Priority Data

Sep. 3, 2004 (JP) ............................. P2004-256856

(51) Int. Cl.
*B60T 7/12* (2006.01)
*G05D 1/00* (2006.01)

(52) U.S. Cl. .................... 701/96; 701/93; 701/301; 340/435; 340/436; 340/903

(58) Field of Classification Search .................. 701/93, 701/96, 301; 340/435–436, 438, 903; 180/170
See application file for complete search history.

(56) References Cited

U.S. PATENT DOCUMENTS 5,197,562 A * 3/1993 Kakinami et al. .......... 180/169

2004/0195022 A1 * 10/2004 Inoue ......................... 180/170
2005/0267608 A1 * 12/2005 Nishira et al. ................ 700/44

FOREIGN PATENT DOCUMENTS

JP 2004-130880 4/2004

* cited by examiner

*Primary Examiner*—Gertrude A. Jeanglaude
(74) *Attorney, Agent, or Firm*—O'Melveny & Myers LLP

(57) ABSTRACT

In an adaptive cruise control (ACC) region where vehicle speed V is greater than a predetermined third vehicle speed #V3, a decrease amount of a target inter-vehicle distance per predetermined unit vehicle speed decrease amount in a state where the vehicle speed V is less than a predetermined fourth vehicle speed #V4 is smaller than a decrease amount of the target inter-vehicle distance per predetermined unit vehicle speed decrease amount in a state where the vehicle speed V is greater than the predetermined fourth vehicle speed #V4. The decrease amount of the target inter-vehicle distance per predetermined unit vehicle speed decrease amount in a state where the vehicle speed V is less than a predetermined first vehicle speed #V1 is larger than a decrease amount of the target inter-vehicle distance per predetermined unit vehicle speed decrease amount in a state where the vehicle speed V is greater than the predetermined first vehicle speed #V1 and less than a predetermined second vehicle speed #V2.

4 Claims, 5 Drawing Sheets

CRUISE CONTROL APPARATUS FOR VEHICLE

BACKGROUND OF THE INVENTION

1. Field of the Invention

The present invention relates to a cruise control apparatus for vehicle. Priority is claimed on Japanese Patent Application No. 2004-256856, the content of which is incorporated herein by reference.

2. Description of Related Art

There is a cruise control apparatus that, for example, detects the existence of a preceding vehicle by using an in-vehicle radar device. When a preceding vehicle is detected, the cruise control apparatus controls speed within a target speed set beforehand so as to keep a predetermined inter-vehicle distance. When a preceding vehicle is not detected, the cruise control apparatus controls speed so as to maintain a target speed (e.g., see Japanese Unexamined Patent Application, First Publication No. 2004-130880).

This type of cruise control apparatus switches and processes two types of controls in accordance with the speed of the subject vehicle, one of which is a low speed following control that, in a relatively low speed region such as, for example, when driving in congested traffic, can stop and start the subject vehicle while following an appropriate operating state including stationary state of the preceding vehicle, and another control is an adaptive cruise control that, in a relatively high speed region, follows the preceding vehicle without assuming stopping of the preceding vehicle.

In the cruise control apparatus according to the prior art, during adaptive cruise control in the relatively high speed region, a target inter-vehicle distance is set in accordance with a predetermined time headway (time after passing through a point with one vehicles until the following vehicles arrive at the same point) and speed, and during low speed following control, a predetermined target inter-vehicle distance to be maintained when the subject vehicle stops due to stopping of the preceding vehicle is set. In order to prevent an abrupt change in the target inter-vehicle distance accompanying a switch of control in speed regions that is switching between adaptive cruise control and low speed following control, a target inter-vehicle distance is obtained by smoothly extending the target inter-vehicle distance set in adaptive cruise control to the low speed following control region side, even in a speed region in which low speed following control is applied and that is close to a speed region in which adaptive cruise control is applied. Moreover, in this case, in an extremely low speed region close to zero speed, the target inter-vehicle distance is obtained by smoothly connecting a target inter-vehicle distance, that is obtained by extending from the speed region in adaptive cruise control, to a predetermined target inter-vehicle distance maintained when the subject vehicle stops in accompanying stoppage of the preceding vehicle in low speed following control.

However, when the target inter-vehicle distance in low speed following control is set simply by smoothly extending the target inter-vehicle distance set in adaptive cruise control to the low speed region side, the target inter-vehicle distance becomes excessively short, particularly in the extremely low speed region. This leads to problems such as, for example, excessive deceleration being required when the subject vehicle decelerates in accompanying an abrupt stoppage and the like of the preceding vehicle, or it may become impossible to suitably react to deceleration of the preceding vehicle.

The present invention is realized in view of the above, and aims to provide a cruise control apparatus for vehicle that can operate suitable deceleration when following appropriate operating status including stoppage of the preceding vehicle.

SUMMARY OF THE INVENTION

In order to achieve the above objects, a cruise control apparatus for vehicle according to a first aspect obtains a preceding vehicle determining device that determines whether or not an object at the traveling direction front of a subject vehicle is a preceding vehicle that the subject vehicle should follow, an inter-vehicle distance measuring device that measures an inter-vehicle distance between the subject vehicle and the preceding vehicle, a time headway setting device that sets a suitable time headway for the preceding vehicle, a speed measuring device that measures the speed of the subject vehicle, a target inter-vehicle distance setting device that sets a target inter-vehicle distance between the subject vehicle and the preceding vehicle, based on a time headway set by the time headway setting device and a speed measured by the speed measuring device, a target vehicle speed setting device that sets a target speed of the subject vehicle so that the inter-vehicle distance, measured by the inter-vehicle distance measuring device, is the same as the target inter-vehicle distance, set by the target inter-vehicle distance setting device, and an acceleration/deceleration control device that controls acceleration/deceleration of the subject vehicle, based on the target speed set by the target vehicle speed setting device, and wherein the target inter-vehicle distance setting device sets the target inter-vehicle distance so as to change with a decreasing tendency along with the speed of the subject vehicle decreases, and at same time, a decrease amount of the target inter-vehicle distance per predetermined speed decrease amount during deceleration control executed by the acceleration/deceleration control device, in a state where the speed measured by the speed measuring device is less than a predetermined first speed at which the self vehicle becomes substantially stationary, is set larger than a decrease amount of the target inter-vehicle distance per predetermined speed decrease amount during acceleration control executed by the acceleration/deceleration control device, in a state where the speed measured by the speed measuring device becomes greater than the predetermined first speed.

According to the cruise control apparatus for vehicle having the configuration described above, in a state where a predetermined target inter-vehicle distance is set in preparation for the case that the subject vehicle stops following the stoppage of the preceding vehicle, the target inter-vehicle distance in a relatively low vehicle speed region can be set to a larger value than in a case where the target inter-vehicle distance is simply smoothly increased according to the increase of the vehicle speed from the predetermined target inter-vehicle distance at zero speed. This prevents a need for excessive deceleration when, for example, the subject vehicle decelerates in accompanying an abrupt stop by the preceding vehicle, and prevents the subject vehicle from becoming incapable of suitably reacting to deceleration of the preceding vehicle.

Moreover, when the subject vehicle becomes substantially stationary, the reduction rate of the target inter-vehicle distance with respect to vehicle speed increases, thereby reducing the braking force required for deceleration. This suppresses nose-dive when stopping and enables the subject vehicle to stop smoothly.

Preferably, the target inter-vehicle distance setting makes a setting so that a decrease amount in the target inter-vehicle distance per predetermined speed decrease amount during deceleration control executed by the acceleration/deceleration control device, in a state where the speed measured by the speed measuring device is lower than a second vehicle speed at which the self vehicle attains a low speed cruise state, is smaller than a decrease amount of the target inter-vehicle distance per predetermined speed decrease amount during acceleration control executed by the acceleration/deceleration control device, in a state where the speed measured by the speed measuring device becomes greater than the predetermined second speed.

According to the cruise control apparatus for vehicle having the above configuration, in a vehicle speed region where the subject vehicle attains a low speed cruise state, the target inter-vehicle distance can be set to a larger value than when it is set by simply smoothly extending change in the target inter-vehicle distance in the vehicle speed region which exceeds the predetermined second speed to the low vehicle speed region side. This prevents a need for excessive deceleration when, for example, the subject vehicle decelerates in accompanying an abrupt stop by the preceding vehicle, and prevents the subject vehicle from becoming incapable of suitably reacting to deceleration of the preceding vehicle.

In the cruise control apparatus for vehicle of this invention, the target inter-vehicle distance setting device sets the target inter-vehicle distance by adding a predetermined offset inter-vehicle distance, that changes in accordance with the speed of the self vehicle, to a target inter-vehicle distance that is set based on the time headway and the speed.

According to the cruise control apparatus for vehicle having this configuration, a predetermined offset inter-vehicle distance, that changes in accordance with, for example, the vehicle speed of the subject vehicle, can be set by storing multiple different data beforehand, and then selecting an appropriate offset inter-vehicle distance in accordance with, for example, the execution state and the like of cruise control. This allows greater freedom when setting the target inter-vehicle distance.

Preferably, during deceleration control executed by the acceleration/deceleration control device, the target inter-vehicle distance setting device sets the target inter-vehicle distance by adding the predetermined offset inter-vehicle distance to a target inter-vehicle distance that is set based on the time headway and the speed.

According to the cruise control apparatus for vehicle having this configuration, by setting a relatively small target inter-vehicle distance when controlling acceleration, for example, immediately after the subject vehicle starts moving, it is possible to maintain a desired acceleration, moreover, by setting a relatively large offset inter-vehicle distance when controlling deceleration, for example, it is possible to prevent a need for excessive deceleration and to prevent the subject vehicle from becoming incapable of suitably reacting to deceleration of the preceding vehicle, even when the subject vehicle decelerates in accompanying an abrupt stop or the like of the preceding vehicle.

According to the cruise control apparatus for vehicle as described above, in a state where a predetermined target inter-vehicle distance is set when the subject vehicle stops as the preceding vehicle stops, the target inter-vehicle distance in a relatively low vehicle speed region can be set to a larger value than in a case where the target inter-vehicle distance is simply smoothly increased from the predetermined target inter-vehicle distance at zero speed as the vehicle speed increases, and this prevents a need for excessive deceleration when, for example, the subject vehicle decelerates in accompanying an abrupt stop by the preceding vehicle, and prevents the subject vehicle from becoming incapable of suitably reacting to deceleration of the preceding vehicle.

Moreover, according to the cruise control apparatus for vehicle of this invention, when the subject vehicle becomes substantially stationary, the reduction rate of the target inter-vehicle distance with respect to vehicle speed increases, thereby reducing the braking force required for deceleration, therefore, nose-dive can be suppressed when stopping and the subject vehicle can be smoothly stopped.

Moreover, according to the cruise control apparatus for vehicle of this invention, in a vehicle speed region where the subject vehicle attains a low speed cruise state, the target inter-vehicle distance can be set to a larger value than when it is set by simply smoothly extending change in the target inter-vehicle distance in the vehicle speed region that exceeds the predetermined second speed to the low vehicle speed region side, therefore, this prevents excessive deceleration when, for example, the subject vehicle decelerates in accompanying an abrupt stop by the preceding vehicle, and prevents the subject vehicle from becoming incapable of suitably reacting to deceleration of the preceding vehicle.

Further, according to the cruise control apparatus for vehicle of this invention, a predetermined offset inter-vehicle distance, that changes in accordance with, for example, the vehicle speed of the subject vehicle, can be set by storing multiple different data beforehand, and then selecting an appropriate offset inter-vehicle distance in accordance with, for example, the execution state and the like of cruise control, therefore, this allows greater freedom when setting the target inter-vehicle distance.

According to the cruise control apparatus for vehicle of this invention, by setting a relatively small target inter-vehicle distance when controlling acceleration it becomes possible to maintain a desired acceleration, for example, immediately after the subject vehicle starts moving, furthermore, by setting a relatively large offset inter-vehicle distance when controlling deceleration, it is possible to prevent a need for excessive deceleration when, for example, the subject vehicle decelerates in accompanying an abrupt stop or the like of the preceding vehicle, and to prevent the subject vehicle from becoming incapable of suitably reacting to deceleration of the preceding vehicle.

DETAILED DESCRIPTION OF THE INVENTION

The cruise control apparatus for vehicle according to an embodiment of this invention will be explained with reference to the accompanying drawings.

Figure 1:
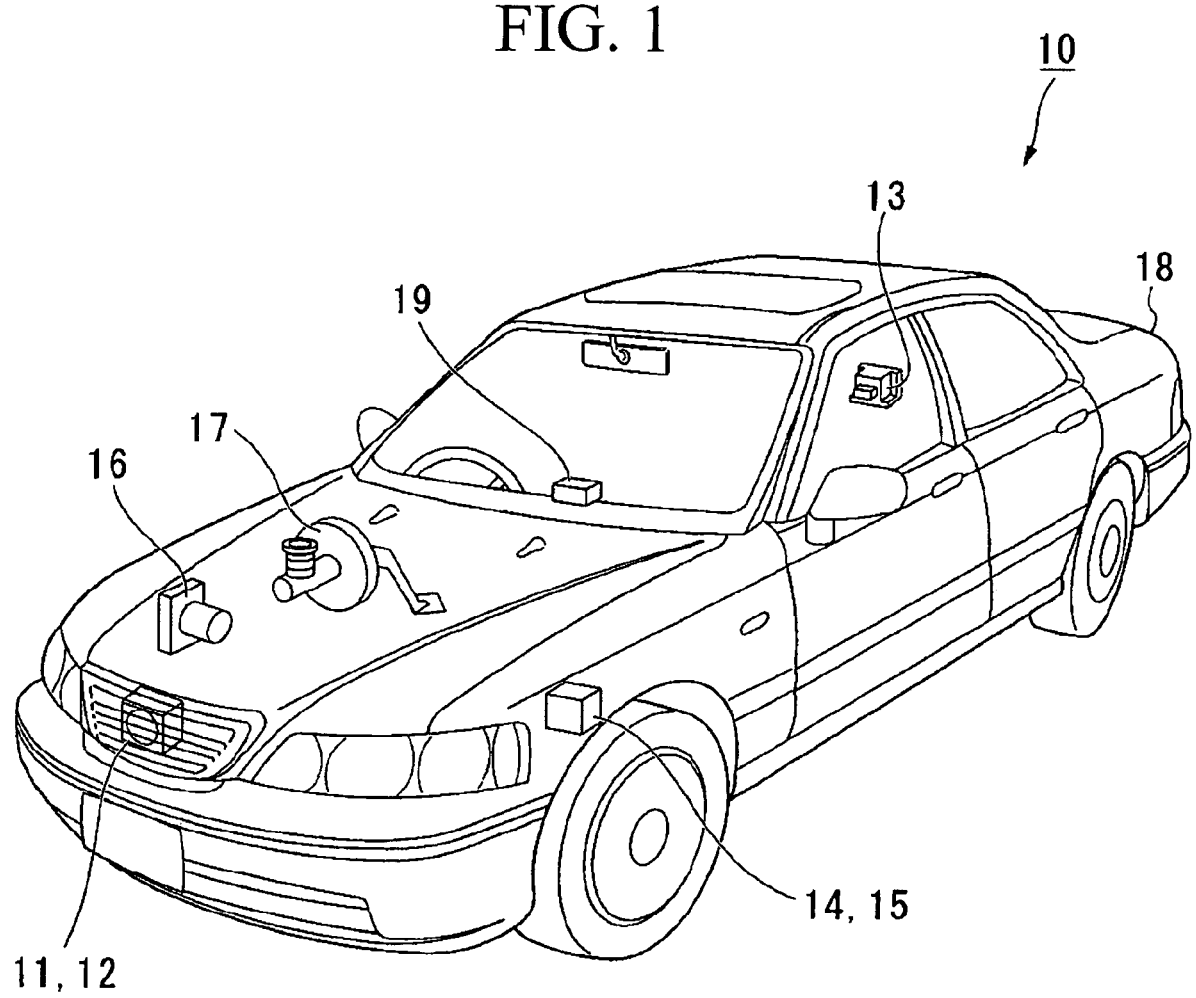
FIG. 1 is a diagram of the configuration of a vehicle according to an embodiment of this invention.
Figure 2:
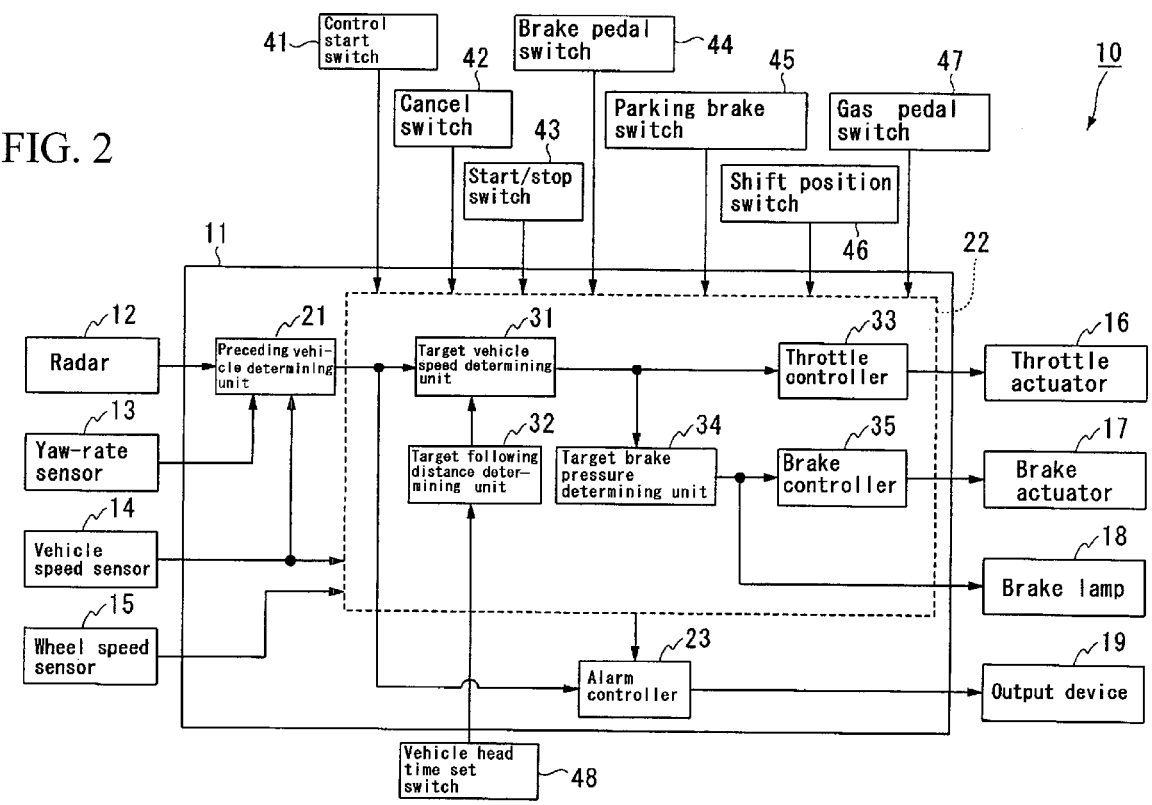
FIG. 2 is a diagram of the configuration of a cruise control apparatus for vehicle according to an embodiment of this invention.

As shown for example in FIGS. 1 and 2, a cruise control apparatus for vehicle 10 according to this embodiment includes a control ECU 11, a radar 12, a yaw-rate sensor 13, a vehicle speed sensor 14, a wheel speed sensor 15, a throttle actuator 16, a brake actuator 17, a brake lamp 18, and an output device 19.

The radar 12 is, for example, a milliwave radar, the control ECU 11 and the radar 12 being formed in a single body and contained, for example, in a nose part of the body of the subject vehicle, as shown in FIG. 1. The radar 12 transmits milliwaves toward the front of the subject vehicle, receives a reflected signal that is generated by reflecting the transmitted signal from a target object to be detected at the front, and generates a beat signal by mixing the reflected signal and the transmitted signal. Based on the frequency of the beat signal, the control ECU 11 calculates the relative speed, and the distance to the target object to be detected within a predetermined detection area, and the like, and calculates the direction of the detected object based on the transmission direction of the milliwaves when the reflected signal is received.

The yaw-rate sensor 13, which is fitted near the rear axle, which is constructed from, for example, a piezoelectric element, a gyro sensor, or the like in order to detect the direction of the subject vehicle on a horizontal plane, the amount of change in the angle of gradient with respect to the vertical direction, and the like, and which measures the yaw-rate, which is the rotational angular speed around the vertical axis of the vehicle's center of gravity, and outputs a signal corresponding to the size of the measured result to the control ECU 11. The vehicle speed sensor 14 measures the cruise speed (vehicle speed) of the subject vehicle, and outputs a signal corresponding to the size of the measured result to the control ECU 11.

The wheel speed sensor 15 measures the wheel speed of the subject vehicle, and outputs a signal corresponding to the size of the measured result to the control ECU 11.

The throttle actuator 16 accelerates or decelerates the subject vehicle by, for example, controlling the opening level of a throttle, based on a control signal output from the control ECU 11.

The brake actuator 17 decelerates the subject vehicle by, for example, controlling the brake fluid pressure or the like, based on a control signal output from the control ECU 11.

The brake lamp 18 is provided at the rear of the subject vehicle, and flashes in accordance with the operating status of the brake.

The output device 19 is, for example, a liquid crystal output device, a speaker, or the like, fitted to an installment panel of the subject vehicle, and outputs various data, warnings, and the like output from the control ECU 11 as a display, sounds, warning sounds, or the like.

The control ECU 11 includes, for example, a preceding vehicle determining unit 21, a cruise controller 22, and an alarm controller 23, and, based on a detected object that is detected within the predetermined detection area of the radar 12, determines whether or not the subject vehicle is following a preceding vehicle. When it determines that a preceding vehicle exists, the control ECU 11 controls the speed of the subject vehicle by controlling the throttle actuator 16 and the brake actuator 17 so as to allow the subject vehicle to follow in accordance with occasional operating status including stoppage of the preceding vehicle by, for example, staying within a predetermined upper speed limit and maintaining a predetermined target inter-vehicle distance, and outputs various data, warnings, and the like, from the output device 19 as a display, sound, warning sounds, or the like. On the other hand, when there is no preceding vehicle, the control ECU 11 controls the speed so as maintain a predetermined speed which is set beforehand.

The preceding vehicle determining unit 21, for example, sets a detected object, that is detected in the predetermined detection area of the radar 12, as a preceding vehicle candidate used in determining whether the subject vehicle is following a preceding vehicle, and determines whether the set preceding vehicle candidate is a moving object or a stationary object.

The preceding vehicle determining unit 21 estimates the travel trajectory of the subject vehicle based on, for example, the yaw-rate of the subject vehicle measured by the yaw-rate sensor 13, and the speed of the subject vehicle (vehicle speed) measured by the vehicle speed sensor 14. This estimation is made by, for example, calculating a corner R from the speed v of the subject vehicle and the yaw-rate y ($r=v/y$), and setting a region, obtained by applying a predetermined lane width to the trajectory which is determined by this corner R, as the travel trajectory of the subject vehicle.

The preceding vehicle determining unit 21 sets the preceding vehicle that the subject vehicle follows by making a selection from multiple preceding vehicle candidates in the estimated travel trajectory of the subject vehicle, in accordance with priority levels that are based on, for example, distance from the subject vehicle, relative speed, and the like.

In accordance with the existence/non-existence of a preceding vehicle as determined by the preceding vehicle determining unit 21, the cruise controller 22 executes speed control of the subject vehicle by selecting one of, for example, following control, maintain stop control, and off control. The cruise controller 22 includes, for example, a target vehicle speed determining unit 31, a target inter-vehicle distance determining unit 32, a throttle controller 33, a target brake pressure determining unit 34, and a brake controller 35. Signals output from a control start switch 41, a cancel switch 42, a start/stop switch 43, a brake pedal switch 44, a parking brake switch 45, a shift position switch 46, a gas pedal switch 47, and a time headway set switch 48, are input to the cruise controller 22.

Following control switches between, for example, low speed following (LSF) in a relatively low vehicle speed region that the subject vehicle can stop/start in while following the preceding vehicle, and adaptive cruise control (ACC) in a relatively high speed region that the subject vehicle need not stop/start in while it is following the preceding vehicle.

When the subject vehicle stops with a predetermined final stop inter-vehicle distance due to stoppage of the preceding vehicle while low speed following is being executed, maintain stop control is executed in accordance with predetermined conditions and the subject vehicle is maintained in a stopped state.

In off control, execution of following control and maintain stop control are cancelled in accordance with predetermined conditions.

When the preceding vehicle determining unit 21 determines that there is a preceding vehicle, the target vehicle speed determining unit 31 sets a target vehicle speed for the speed of the subject vehicle (vehicle speed) based on information such as the distance from the subject vehicle to the preceding vehicle and their relative speeds, and the target inter-vehicle distance input from the target inter-vehicle distance determining unit 32, and outputs a control signal to the throttle controller 33 and the target brake pressure determining unit 34 so as to change the vehicle speed of the subject vehicle to the set target vehicle speed.

Based on a predetermined time headway (i.e. the time required for the subject vehicle to catch up with the preceding vehicle) that is input from the time headway set switch 48 by, for example, an operation of the driver, and the vehicle speed of the subject vehicle, the target inter-vehicle distance determining unit 32 sets a target inter-vehicle distance and outputs it to the target vehicle speed determining unit 31.

The time headway that can be set by an input operation made by the driver using the time headway set switch 48 is set to the predetermined time required to maintain at least a predetermined inter-vehicle distance to the preceding vehicle.

In accordance with the target vehicle speed set by the target vehicle speed determining unit 31, the throttle controller 33 controls the throttle actuator 16 by setting the throttle opening in accordance with an acceleration or deceleration to change the vehicle speed of the subject vehicle to the target vehicle speed which is set.

In accordance with the target vehicle speed set by the target vehicle speed determining unit 31, the target brake pressure determining unit 34 sets a target brake pressure in correspondence with a deceleration to change the vehicle speed of the subject vehicle to the target vehicle speed which is set. The brake controller 35 controls the brake actuator 17 in accordance with the target brake pressure set by the target brake pressure determining unit 34.

The switches 41, 42, 43, and 48 are, for example, set at predetermined positions near the steering wheel and the like in front of the driving seat, and output signal corresponding to input operations made by the driver to the cruise controller 22 of the control ECU 11.

The control start switch 41 outputs a signal indicating the start of following control in accordance with an input operation by the driver.

The cancel switch 42 outputs a signal indicating the cancellation of following control and maintain stop control in accordance with an input operation by the driver.

The start/stop switch 43 outputs a signal indicating start/stop of the subject vehicle in accordance with an input operation by the driver.

The brake pedal switch 44 measures a manipulation state of an unillustrated brake pedal by the driver, i.e. the on/off state of the brake pedal and the amount of brake pedal manipulation, and outputs the measured result to the cruise controller 22.

The parking brake switch 45 detects a manipulation state of an unillustrated parking brake by the driver, i.e. the on/off state of the parking brake, and outputs the measured result to the cruise controller 22.

The shift position switch 46 detects a manipulation state of an unillustrated shift lever by the driver, i.e. the shift position, and outputs the detected result to the cruise controller 22.

The gas pedal switch 47 measures a manipulation state of an unillustrated gas pedal by a passenger in the vehicle, i.e. the on/off state of the gas pedal and the amount of gas pedal manipulation, and outputs the measured result to the cruise controller 22.

The alarm controller 23 controls the display of various types of data, warnings, and the like, in accordance with, for example, the existence/non-existence of a preceding vehicle as determined by the preceding vehicle determining unit 21, and a control signal output from the cruise controller 22.

The cruise control apparatus for vehicle 10 of this embodiment has the constitution described above. Subsequently, the operation of the cruise control apparatus for vehicle 10, in particular the operation of the target inter-vehicle distance determining unit 32 that sets a target inter-vehicle distance based on a the subject vehicle speed and a time headway input from the time headway set switch 48, will be explained with reference to the accompanying drawings.

Figure 3:
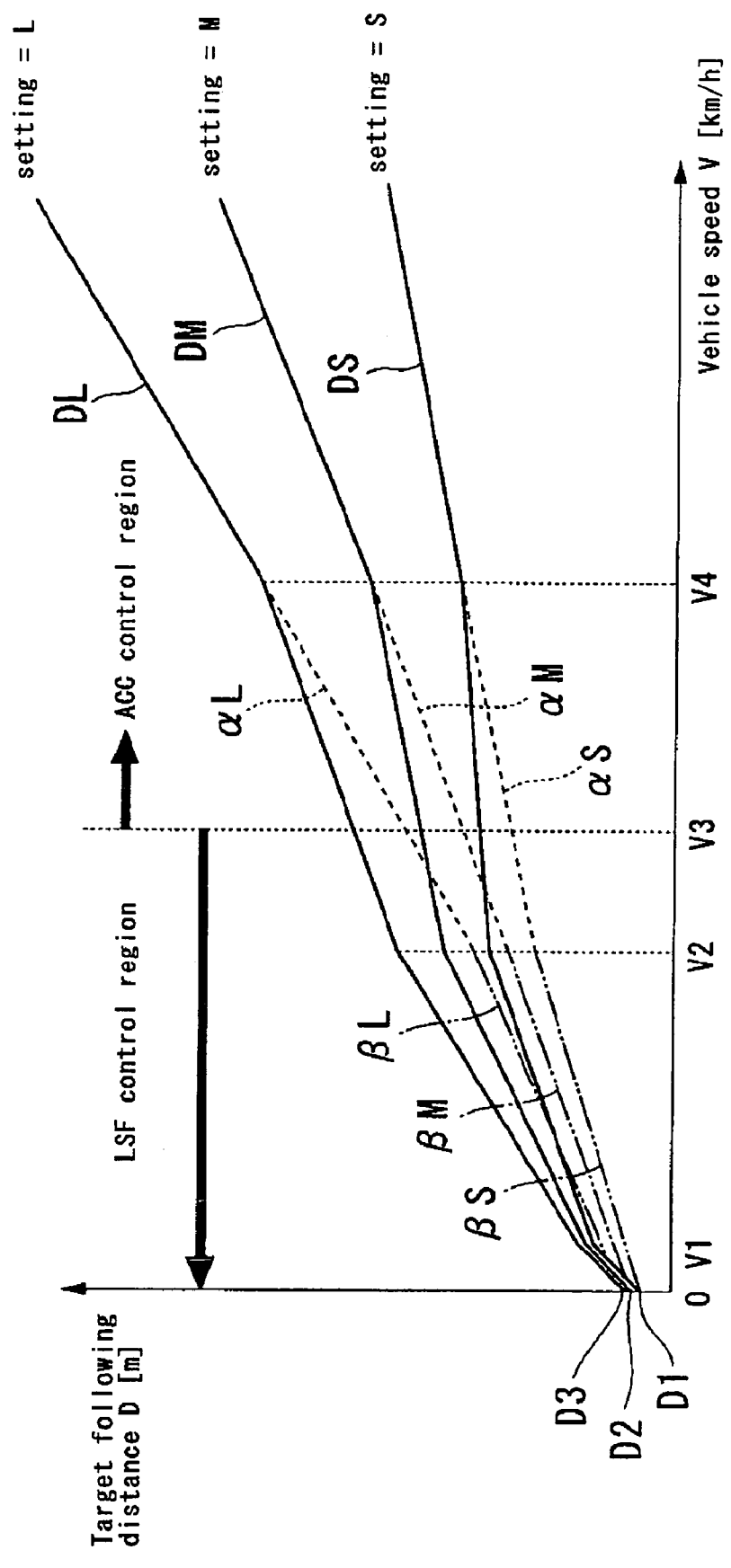
FIG. 3 is a graph of an example of target inter-vehicle distance in accordance with time headway and speed of subject vehicle.

As for example shown in FIG. 3, the cruise control apparatus for vehicle 10 executes adaptive cruise control (ACC) when vehicle speed V is in a speed region greater than a predetermined third vehicle speed #V3 (e.g. #V3=40 km/h or the like), and executes low speed following (LSF) when the vehicle speed V is in a speed region less than the predetermined third vehicle speed #V3.

The driver manipulates the time headway set switch 48 to input a predetermined time headway, enabling multiple settings (e.g. L, M, and S) to be selected, and a target inter-vehicle distance D corresponding the vehicle speed V is set for each time headway setting.

Firstly, in an adaptive cruise control (ACC) region where the vehicle speed V is higher than the predetermined third vehicle speed #V3 (e.g. #V3=40 km/h or the like), the decrease amount of the target inter-vehicle distance per predetermined unit vehicle speed decrease amount when the vehicle speed V is less than a predetermined fourth vehicle speed #V4 (e.g. #V4=60 km/h or the like) is set smaller than the decrease amount of the target inter-vehicle distance per-predetermined unit vehicle speed decrease amount when the vehicle speed V is higher than the predetermined fourth vehicle speed #V4 (e.g. #V4=60 km/h or the like).

In a vehicle speed region that runs from the predetermined fourth vehicle speed #V4 in the adaptive cruise control (ACC) region to a predetermined second vehicle speed #V2 (e.g. #V2=30 km/h or the like) in a low speed following (LSF) that is smaller than the predetermined third vehicle speed #V3 (e.g. #V3=40 km/h or the like) where control switches between ACC and LSF, change in the target inter-vehicle distance D corresponding the vehicle speed V in the LSF region is set in a manner such as change in the target inter-vehicle distance D corresponding to the vehicle speed V set in the ACC region is extended smoothly to the low vehicle speed region side.

Accordingly, in the vehicle speed region from the predetermined fourth vehicle speed #V4 to the predetermined second vehicle speed #V2, running across the adaptive cruise control (ACC) region and the low speed following (LSF) region, change in the target inter-vehicle distance D corresponding the vehicle speed V set in the vehicle speed region where, for example, the vehicle speed V in the ACC region is higher than the predetermined fourth vehicle speed #V4, is set to a target inter-vehicle distance D (e.g. the solid lines DL, DM, and DS, shown in FIG. 3) that is greater than the target inter-vehicle distance D (e.g. the dotted lines αL, αM, and αS, shown in FIG. 3) obtained by smooth extension to the low vehicle speed region side.

In the low speed following (LSF) region where the vehicle speed V is less than the predetermined third vehicle speed #V3 (e.g. #V3=40 km/h or the like), the decrease amount of the target inter-vehicle distance per predetermined unit vehicle speed decrease amount in the state where the vehicle speed V is less than the predetermined second vehicle speed #V2 (e.g. #V2=30 km/h or the like) and higher than a predetermined second vehicle speed #V1 (e.g. #V1=7 km/h or the like), at which the vehicle is substantially stationary, is set greater than a decrease amount of the target inter-vehicle distance per predetermined unit vehicle speed decrease amount in the state where the vehicle speed V is greater than the predetermined second vehicle speed #V2 (e.g. #V2=30 km/h or the like).

Moreover, the decrease amount of the target inter-vehicle distance per predetermined unit vehicle speed decrease amount in the state where the vehicle speed V is less than the predetermined first vehicle speed #V1 (e.g. #V1=7 km/h or the like) is set greater than the decrease amount of the target inter-vehicle distance per predetermined unit vehicle speed decrease amount in the state where the vehicle speed V is greater than the predetermined first vehicle speed #V1 (e.g. #V1=7 km/h or the like) and less than the predetermined second vehicle speed #V2 (e.g. #V2=30 km/h or the like).

Accordingly, in the vehicle speed region of the LSF region where the vehicle speed V is less than the second vehicle speed #V2, change in the target inter-vehicle distance D corresponding to the vehicle speed V, that is set in the vehicle speed region where, for example, the vehicle speed V in the ACC region is higher than the predetermined fourth vehicle speed #V4, is set to a predetermined target inter-vehicle distance D (e.g. the solid lines DL, DM, and DS shown in FIG. 3) that has a greater value than the predetermined target inter-vehicle distance D (e.g. the alternate dotted and broken lines βL, βM, and βS, shown in FIG. 3) that is obtained by further smooth extension to the low vehicle speed region side of a predetermined target inter-vehicle distance D (e.g. the dotted lines αL, αM, and αS, shown in FIG. 3) which is obtained by smooth extension to the low vehicle speed region side, until it reaches a predetermined target inter-vehicle distance D (e.g. stationary target inter-vehicle distances D1, D2, and D3, shown in FIG. 3) that is maintained when the subject vehicle is stationary.

According to the cruise control apparatus for vehicle 10 of this embodiment described above, change in the target inter-vehicle distance D, that corresponds to the vehicle speed set in the vehicle speed region where, for example, vehicle speed V in the ACC region is higher than the predetermined fourth vehicle speed #V4, can be set to a value that is greater than the target inter-vehicle distance in the relatively low vehicle speed region, in comparison with the target inter-vehicle distance D (e.g. the alternate dotted and broken lines βL, βM, and βS, shown in FIG. 3) that is obtained by further smooth extension to the low vehicle speed region side of a predetermined target inter-vehicle distance D (e.g. the dotted lines αL, αM, and αS, shown in FIG. 3) which is obtained by smooth extension to the low vehicle speed region side, until it reaches a predetermined target inter-vehicle distance D (e.g. stationary target inter-vehicle distances D1, D2, and D3, shown in FIG. 3) that is maintained when the subject vehicle is stationary. This prevents a need for excessive deceleration when, for example, the subject vehicle decelerates in accordance with an abrupt stop of the preceding vehicle, and prevents the subject vehicle from becoming incapable of suitably reacting to deceleration of the preceding vehicle.

While controlling deceleration, the reduction rate of the target inter-vehicle distance with respect to vehicle speed increases when the subject vehicle becomes substantially stationary, thereby reducing the braking force required for deceleration. This suppresses nose-dive when stopping, enabling the subject vehicle to be smoothly stopped.

In the embodiment described above, when executing following control, while the predetermined target inter-vehicle distance D shown in FIG. 3 (e.g. solid lines DL, DM, and DS, shown in FIG. 3) is set based on the vehicle head speed input from the time headway set switch 48 and the vehicle speed V of the subject vehicle, there are not restrictions on this. For example, the predetermined target inter-vehicle distance D shown in FIG. 4 may be set based on the vehicle head speed input from the time headway set switch 48 and the vehicle speed V of the subject vehicle, and a value obtained by adding an inter-vehicle offset E shown in FIG. 5 to the predetermined target inter-vehicle distance D shown in FIG. 4 under predetermined conditions (e.g. when decelerating during following control, and the like) may be set as a new target inter-vehicle distance D.

Figure 4:
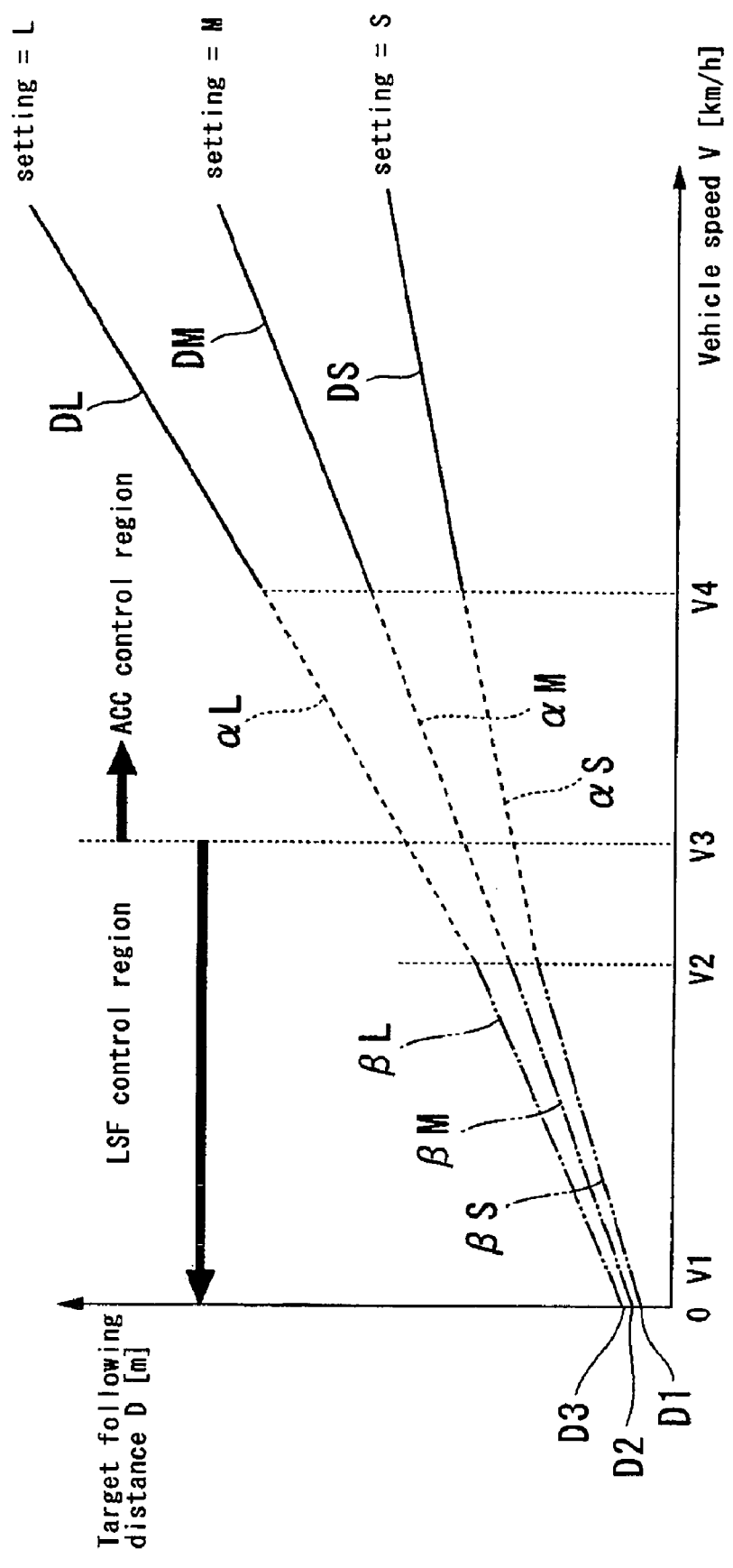
FIG. 4 is a graph of an example of target inter-vehicle distance in accordance with time headway and speed of subject vehicle according to a modification of this embodiment.

In other words, in this example of modification, the predetermined target inter-vehicle distance D shown in FIG. 4 includes the target inter-vehicle distance D (e.g. solid lines DL, DM, and DS, shown in FIG. 4) corresponding the vehicle speed V set in the vehicle speed region where, for example, the vehicle speed V in the adaptive cruise control (ACC) region is greater than a predetermined fourth vehicle speed #V4, the target inter-vehicle distance D (e.g. dotted lines αL, αM, and αS, shown in FIG. 4) that is obtained by smoothly extending change in the target inter-vehicle distance D to the low vehicle speed region side that reaches the low speed following (LSF) region, and the target inter-vehicle distance D (e.g. the alternate dotted and broken lines βL, βM, and βS, shown in FIG. 4) that is obtained by smoothly extending change in the target inter-vehicle distance D (e.g. dotted lines αL, αM, and αS, shown in FIG. 4) to the extreme low region side so that it reaches a predetermined target inter-vehicle distance (e.g. stationary target inter-vehicle distances D1, D2, and D3, shown in FIG. 4).

Figure 5:
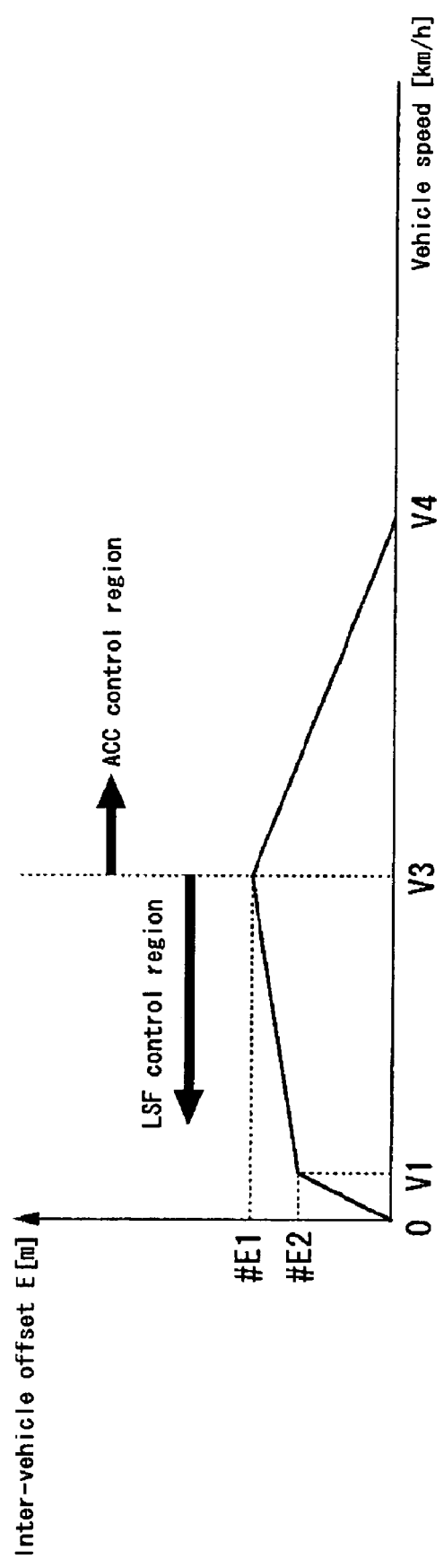
FIG. 5 is a graph of an example of an inter-vehicle offset in accordance with vehicle speed of the subject vehicle according to a modification of this embodiment.

The predetermined inter-vehicle offset E shown in FIG. 5 is set such that, as the vehicle speed V increases in the low speed following (LSF) region from vehicle speed zero to the predetermined third vehicle speed #V3, the inter-vehicle offset E changes with increasing tendency from zero to a predetermined value #E1 (e.g. #E1=4 m, or the like), and, in the adaptive cruise control (ACC) region where vehicle speed is greater than the predetermined third vehicle speed #V3, as the vehicle speed V increases from the predetermined third vehicle speed #V3 until it reaches the predetermined fourth vehicle speed #V4, the inter-vehicle offset E changes with decreasing tendency from the predetermined value #E1 (e.g. #E1=4 m, or the like) to zero.

Moreover, the inter-vehicle offset E is set such that, in the low speed following (LSF) region, the increase amount of the inter-vehicle offset per predetermined unit vehicle speed increase amount in the state where the vehicle speed V is less than a predetermined first vehicle speed #V1 (e.g. #V1=7 km/h, or the like) is larger than the increase amount of the inter-vehicle offset per predetermined unit vehicle speed increase amount in the state where the vehicle speed V becomes larger than the predetermined first vehicle speed #V1 (e.g. #V1=7 km/h, or the like). At the predetermined first vehicle speed #V1 (e.g. #V1=7 km/h, or the like), the inter-vehicle offset E is set to a predetermined value #E2 (<#E1, e.g. #E2=3 m, or the like).

In this example of modification, the predetermined inter-vehicle offset E that changes in accordance with, for example, the vehicle speed of the subject vehicle may be set by storing multiple different data beforehand, and then selecting the appropriate inter-vehicle offset E in accordance with, for example, the execution state and the like of following control. This allows greater freedom when setting the target inter-vehicle distance D.

Moreover, by setting the target inter-vehicle distance D to a relatively low value when, for example, controlling acceleration, it becomes possible to maintain a desired acceleration, for example, immediately after the subject vehicle starts moving. In addition, by setting the inter-vehicle offset E to a relatively large value when controlling deceleration, it is possible to prevent a need for excessive deceleration when, for example, the subject vehicle decelerates in accordance with an abrupt stop of the preceding vehicle, and to prevent the subject vehicle from becoming incapable of suitably reacting to deceleration of the preceding vehicle.

What is claimed is:

1. A cruise control apparatus for vehicle comprising:
    a preceding vehicle determining device that determines whether or not an object at a traveling direction front of a subject vehicle is a preceding vehicle that the subject vehicle follows;
    an inter-vehicle distance measuring device that measures an inter-vehicle distance between the subject vehicle and the preceding vehicle;
    a time headway setting device that sets a suitable time headway for the preceding vehicle;
    a speed measuring device that measures speed of the subject vehicle;
    a target inter-vehicle distance setting device that sets a target inter-vehicle distance between the subject vehicle and the preceding vehicle, based on the time headway set by the time headway setting device and the speed measured by the speed measuring device;
    a target vehicle speed setting device that sets a target speed of the subject vehicle in order that the inter-vehicle distance which is measured by the inter-vehicle distance measuring device, becomes same as the target inter-vehicle distance which is set by the target inter-vehicle distance setting device; and
    an acceleration/deceleration control device that controls acceleration/deceleration of the subject vehicle, based on the target speed which is set by the target vehicle speed setting device, wherein:
    the target inter-vehicle distance setting device sets the target inter-vehicle distance so as to change with a decreasing tendency as the speed of the subject vehicle decreases; and,
    a decrease amount of the target inter-vehicle distance per predetermined speed decrease amount during deceleration control executed by the acceleration/deceleration control device, in a state where the speed measured by the speed measuring device is less than a predetermined first speed at which the subject vehicle becomes substantially stationary, is set to be larger than a decrease amount of the target inter-vehicle distance per predetermined speed decrease amount during acceleration control executed by the acceleration/deceleration control device, in a state where the speed measured by the speed measuring device becomes greater than the predetermined first speed.

2. The cruise control apparatus for vehicle according to claim 1, wherein the target inter-vehicle distance setting device makes a setting in order that a decrease amount in the target inter-vehicle distance per predetermined speed decrease amount during deceleration control executed by the acceleration/deceleration control device, in a state where the speed measured by the speed measuring device is lower than a second vehicle speed at which the subject vehicle attains a low speed cruise state, becomes smaller than a decrease amount of the target inter-vehicle distance per predetermined speed decrease amount during acceleration control executed by the acceleration/deceleration control device, in a state where the speed measured by the speed measuring device is greater than the predetermined second speed.

3. The cruise control apparatus for vehicle according to claims 1, wherein the target inter-vehicle distance setting device sets the target inter-vehicle distance by adding a predetermined offset inter-vehicle distance accompanied by changes of the speed of the subject vehicle, to a target inter-vehicle distance that is set based on the time headway and the speed.

4. The cruise control apparatus for vehicle according to claim 3, wherein, during deceleration control executed by the acceleration/deceleration control device, the target inter-vehicle distance setting device sets the target inter-vehicle distance by adding the predetermined offset inter-vehicle distance to a target inter-vehicle distance that is set based on the time headway and the speed.

* * * * *